United States Patent [19]

Hearsey et al.

[11] 3,865,875

[45] Feb. 11, 1975

[54] METHOD OF PURIFYING SECONDARY AMMONIUM N,N-DISUBSTITUTED THIOLCARBAMATES

[75] Inventors: Colin John Hearsey, Surbiton/Surrey; Brahm Dev Mehta, London, both of England

[73] Assignee: Quimco GmbH, Zuerich, Switzerland

[22] Filed: Dec. 6, 1972

[21] Appl. No.: 312,750

[30] Foreign Application Priority Data
Dec. 6, 1971    Great Britain .................... 56580/71

[52] U.S. Cl. ....................... 260/553 R, 260/294.8 E
[51] Int. Cl. ............................................. C07d 31/48
[58] Field of Search ...... 260/553 R, 295 E, 294.8 E, 260/295.5 D

[56] References Cited
UNITED STATES PATENTS
3,392,197   7/1968   Swakon ........................... 260/553 R
3,539,587   11/1970   Swakon ........................... 260/309.7

Primary Examiner—Alan L. Rotman
Attorney, Agent, or Firm—Clelle W. Upchurch

[57] ABSTRACT

The present invention provides a method of purifying secondary ammonium N,N-disubstituted thiolcarbamates of the general formula:

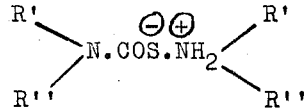

in which R' and R'', which may be the same or different, are unsubstituted or substituted aliphatic radicals or in which R' and R'' together represent an unsubstituted or substituted divalent aliphatic radical, wherein a solution of a secondary ammonium N,N-disubstituted thiolcarbamate of the above-given general formula in a solvent, which solution also contains impurities, is distilled to give a distillate containing the desired thiolcarbamate in the solvent.

4 Claims, No Drawings

METHOD OF PURIFYING SECONDARY AMMONIUM N,N-DISUBSTITUTED THIOLCARBAMATES

The present invention is concerned with a process for the preparation and purification in a solvent of secondary ammonium N,N-disubstituted thiolcarbamates.

The above-mentioned thiolcarbamate compounds are of considerable value as intermediates in the preparation of a wide range of useful products, including substituted ureas, carbamates, isocyanates and S-alkyl thiolcarbamates and it is desirable to be able to prepare them in a pure form suitable for further reaction. It is an object of the present invention to provide such a process.

It is known that a substituted ammonium thiolcarbamate can be prepared by the reaction of a secondary aliphatic amine with carbonyl sulphide or with carbon monoxide and sulphur. The first method gives a pure product but requires the prior preparation of carbonyl sulphide, an additional step which has an adverse effect on the economy of the overall process. The second method, which gives the desired product in a single step but in a less pure form, is normally carried out in a solvent and it has been reported that the products may be isolated from the resulting solution by cooling and filtering. However, they decompose on standing in the air so that isolation by filtration is undesirable. Furthermore, by-product impurities may be retained with the main product.

We have now found that a secondary ammonium N,N-disubstituted thiolcarbamate prepared in a solvent may be distilled, either at atmospheric pressure or under reduced pressure, so that the salt product co-distils with the solvent, the boiling point of which may lie within a wide tmeperature range, to give a distillate which consists of a mixture of salt product and solvent. Most of the reaction by-products and any unreacted sulphur remain in the distillation residue. In carrying out this process, the product need not be separated from the solvent at any stage. Thus, the danger of decomposition is minimised and, in addition, the product is available in the presence of a solvent, which is the form in which it is normally required for subsequent reactions. The carrying out of the process of the present invention prior to a subsequent reaction frequently gives a final product, after the subsequent reaction, which can be used without further purification.

Thus, according to the present invention, there is provided a method of purifying secondary ammonium N,N-disubstituted thiolcarbamates of the general formula:

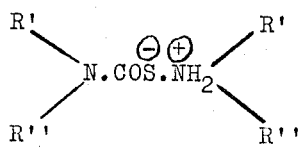

in which R' and R", which may be the same or different, are unsubstituted or substituted aliphatic radicals or in which R' and R" together represent an unsubstituted or substituted divalent aliphatic radical, wherein a solution of a secondary ammonium N,N-disubstituted thiolcarbamate of the above-given general formula in a solvent, which solution also contains impurities, is distilled to give a distillate containing the desired thiolcarbamate in the solvent.

The method of the present invention is particularly useful when the product is prepared from a secondary aliphatic amine, carbon monoxide and sulphur by the following process:

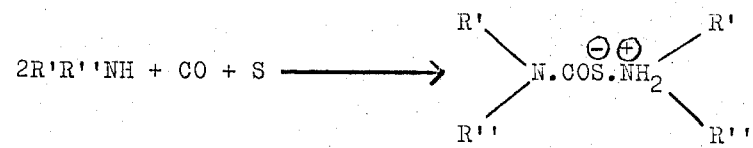

in which R' and R" have the same meanings as above.

Examples of R' and R" in the above-given general formulae include methyl, ethyl, n-propyl, iso-propyl, sec.-butyl, iso-butyl, vinyl and allyl radicals.

Examples of secondary amines which can be used also include compounds in which R' and R" together constitute a single divalent aliphatic radical, such as pyrrolidine, piperidine or morpholine.

Examples of solvents which can be used according to the present invention include benzene, toluene, xylenes, chlorobenzene and o-dichlorobenzene.

The secondary ammonium N,N-disubstituted thiolcarbamates obtained by the method according to the present invention can be used for the preparation of trisubstituted ureas of the general formula:

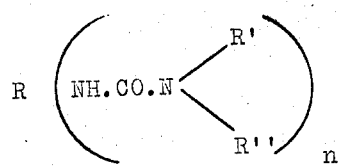

in which R is an unsubstituted or substituted mono-, di- or polyvalent aliphatic, cycloaliphatic, heterocyclic or aromatic radical, R' and R" have the same meanings as above or may be together represent an unsubstituted or substituted divalent radical in which at least one of the two carbon atoms adjoining the nitrogen atom of the urea is aliphatic and $n$ ist an integer, wherein a primary amine of the general formula:

$$R(NH_2)_n$$

in which R and $n$ have the same meanings as above, is reacted with a thiolcarbamate of the general formula:

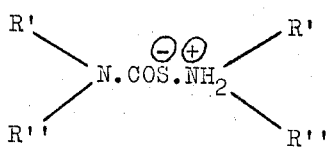

in which R' and R" have the same meanings as above.

As substituents, the radicals R, R' and R" can contain, for example, halogen atoms, hydroxyl groups or alkyl, alkoxy, aryl or heterocyclic radicals.

Although the thiolcarbamates used as starting materials can be obtained in the manner described above, it is to be understood that there can also be used thiolcarbamates prepared in some other manner.

The above-mentioned tri-substituted ureas are preferably prepared in a solvent, the preferred solvent being that in which the thiolcarbamate has been obtained. The preferred temperature range for the reaction is 50°–200°C. It is also preferred to carry out the reaction with the use of an excess of the thiolcarbamate.

The yield of tri-substituted urea obtained is dependent upon the reaction time and upon the temperature used. Under optimum conditions, the yield obtained is virtually quantitative.

After completion of the reaction, the product can be isolated by distilling off the volatiles and recrystallising the residue.

The above-mentioned tri-substituted ureas can be readily converted into mono- or polyisocyanates and can also be used for the preparation of carbamates.

The secondary ammonium N,N-disubstituted thiolcarbamates obtained by the method according to the present invention can also be used for the preparation of 1,1-dialkylureas by reacting them with ammonia. However, it is again to be understood that the thiolcarbamates used as starting materials may be prepared by methods other than that referred to above.

The reaction with ammonia is normally carried out at a temperature within the range of 70° to 200°C. and preferably in the presence of a solvent and especially in the solvent in which the thiolcarbamate has been obtained.

After completion of the reaction, the product may be isolated by filtration or by distilling off the volatiles. The product is immediately obtained in a pure form but may, if desired, be further purified by recrystallisation.

The following Examples are given for the purpose of illustrating the present invention:

EXAMPLE 1

A ½ litre autoclave was charged with 183 g. diethylamine, 42 g. sulphur and 150 g. benzene and carbon monoxide passed in, while stirring, until the autoclave pressure reached 60 atmospheres. The temperature was raised to 100°C. and, after the autoclave pressure had fallen, additional carbon monoxide was admitted to increase the pressure again to 60 atmospheres. Further pressure renewal was repeated as necessary. After the reaction was complete, which was indicated by the achievement of a constant pressure (<30 minutes), the autoclave was allowed to cool below 70°C. and the contents were removed. The product was co-distilled with the benzene at atmospheric pressure to provide 370 g. of distillate which was estimated by analysis to contain 170 g. diethylammonium N,N-diethylthiolcarbamate.

EXAMPLE 2

110 g. dimethylamine, 40 g. sulphur and carbon monoxide were reacted in 150 g. toluene using the method described in Example 1. The product was co-distilled with the toluene under reduced pressure to give 260 g. of distillate which was estimated by analysis to contain 115 g. dimethylammonium N,N-dimethylthiolcarbamate.

EXAMPLE 3

A ½ litre autoclave was charged with 112 g. dimethylamine, 50 g. sulphur and 150 g. monochlorobenzene at 20°C. Carbon monoxide was passed into the autoclave, while stirring, until the pressure reached 50 atmospheres. After the autoclave pressure had dropped, additional carbon monoxide was admitted to increase the pressure again to 50 atmospheres. This process was repeated at intervals as necessary but the rate and frequency of the further addition of carbon monoxide was controlled in such a way as to prevent the exothermic reaction from causing the temperature to rise above 50°C. After the reaction was complete (<30 minutes), the contents of the autoclave were removed and the product was co-distilled with the monochlorobenzene under reduced pressure to give a distillate which was estimated by analysis to contain 140 g. dimethylammonium N,N-dimethylthiolcarbamate.

EXAMPLE 4

A ½ litre autoclave was charged with 112 g. dimethylamine, 50 g. sulphur and 150 g. o-xylene and the temperature was raised to 60°C. The mixture was stirred and carbon monoxide was passed in until the pressure reached 12 atmospheres. After the pressure had dropped, further carbon monoxide was admitted to increase the pressure again to 12 atmospheres. This process was repeated at intervals as necessary but at such a rate that the temperature did not rise above 90°C. After the reaction was complete (<30 minutes), the contents of the autoclave were allowed to cool to below 70°C. They were then removed and distilled under reduced pressure to give 285 g. of a distillate which was estimated by analysis to contain 140 g. dimethylammonium N,N-dimethylthiolcarbamate.

EXAMPLE 5

4.0 g. Aniline were reacted under reflux (80°C.) with 14.0 g. diethylammonium N,N-diethylthiolcarbamate in 50 g. benzene for 7 hours. At the end of this period, the volatiles were distilled off and the residue was recrystallised from petroleum ether (b.p. 60°–80°C.) to give 1-phenyl-3,3-diethylurea, which had a melting point of 84°–85°C. The yield was 8.1 g. (98% of theory).

EXAMPLE 6

4.0 g. 4,4'-Methylenedianiline were reacted under reflux (132°C.) with 15.0 g. diethylammonium N,N-diethylthiolcarbamate in 45 g. monochlorobenzene for 1 hour. At the end of this period, the volatiles were distilled off and the residue was recrystallised from benzene to give 1,1-(methylene-di-p-phenylene)-bis-3,3-diethylurea, which had a melting point of 175°–176°C. The yield was 7.8 g. (98% of theory).

EXAMPLE 7

1.9 g. p-Chloroaniline were reacted under reflux (80°C.) with 9.0 g. dimethylammonium N,N-dimethylthiolcarbamate in 46 g. benzene for 15 hours. At the end of this period, the reaction mixture was allowed to cool and the product was filtered and recrystallised from benzene to give 1-p-chlorophenyl-3,3-dimethylurea, which had a melting point of 170°–172°C. The yield was 2.8 g. (95% of theory).

EXAMPLE 8

3.9 g. m-Chloroaniline were reacted with 25.0 g. dimethylammonium N,N-dimethylthiolcarbamate in 50 g. benzene in the manner described in Example 7 to give 1-m-chlorophenyl-3,3-dimethylurea, which had a melting point of 140°–142°C. The yield was 5.6 g. (92% of theory).

EXAMPLE 9

4.0 g. 1,5-Naphthylenediamine were reacted with 25.0 g. diethylammonium N,N-diethylthiolcarbamate in 40 g. benzene in the manner described in Example 7 to give 1,1'-(1,5-naphthylene)-bis-3,3-diethylurea, which had a melting point of 226°–230°C. The yield was 8.5 g. (95% of theory).

EXAMPLE 10

4.0 g. Aniline were reacted under reflux (110°C.) with 14.0 g. dimethylammonium N,N-dimethylthiolcarbamate in 45 g. toluene for 2 hours. At the end of this period, the volatiles were distilled off and the residue was recrystallised from benzene to give 1-phenyl-3,3-dimethylurea, which had a melting point of 130°–131°C. The yield was 6.7 g. (95% of theory).

EXAMPLE 11

4.0 g. Aniline were reacted under reflux (132°C.) with 10.0 g. dimethylammonium N,N-dimethylthiolcarbamate in 50 g. monochlorobenzene for 1 hour. At the end of this period, the volatiles were distilled off and the residue was recrystallised from benzene to give 1-phenyl-3,3-dimethylurea, which had a melting point of 130°–132°C. The yield was 6.9 g. (98% of theory).

EXAMPLE 12

2.0 g. m-Chloroaniline were reacted under reflux (132°C.) with 5.0 g. dimethylammonium N,N-dimethylthiolcarbamate in 27 g. monochlorobenzene for 1 hour. At the end of this period, the volatiles were distilled off and the residue was recrystallised from benzene to give 1-m-chlorophenyl-3,3-dimethylurea, which had a melting point of 141°–143°C. The yield was 2.9 g. (93% of theory).

EXAMPLE 13

3.6 g. Hexamethylenediamine were reacted for 15 hours under reflux (80°C.) with 40.0 g. diethylammonium N,N-diethylthiolcarbamate in 80 g. benzene. At the end of the reaction, the volatiles were distilled off and the residue was recrystallised from benzene to give 1,1'-hexamethylene-bis-3,3-diethylurea, which had a melting point of 101°–104°C. The yield was 9.2 g. (95% of theory).

EXAMPLE 14

20.0 g. n-Decylamine were reacted with 50 g. dimethyl ammonium N,N-dimethylthiolcarbamate in 50 g. chlorobenzene for 2.5 hours under reflux. At the end of this period, the volatiles were distilled off and the residue was recrystallised from petroleum ether (b.p. 60°–80°C.) to give 1-n-decyl-3,3-dimethylurea, which had a melting point of 40°–42°C. The yield was 27.5 g. (95% of theory).

EXAMPLE 15

4.0 g. Hexamethylene diamine were reacted with 45 g. diethyl ammonium N,N-diethylthiolcarbamate in 80 g. chlorobenzene for 3 hours under reflux. At the end of this period, the volatiles were distilled off and the residue was recrystallised from benzene to give 1,1'-hexamethylene-bis-3,3-diethylurea, which had a melting point of 101°–104°C. The yield was 10.2 g. (95% of theory).

EXAMPLE 16

5.0 g. Cyclohexylamine were reacted with 27 g. dimethyl ammonium N,N-dimethylthiolcarbamate in 30 g. chlorobenzene for 2 hours under reflux. The volatiles were then distilled off and the residue was recrystallised from benzene to give 1-cyclohexyl-3,3-dimethylurea, which had a melting point of 160°–161°C. The yield was 8.1 g. (94% of theory).

EXAMPLE 17

A solution of 26.8 g. methylamine in 54 g. ethanol was mixed with 200 g. dimethylammonium N,N-dimethylthiolcarbamate and 200 g. chlorobenzene. The resulting solution was stirred vigorously in a closed flask at ambient temperature for one hour and then heated under reflux for 5 hours. The volatiles were then distilled off and the residue was recrystallised from a mixture of benzene and petroleum ether (b.p. 40°–60C.) to give trimethylurea, which had a melting point of 69°–71°C. The yield was 70.5 g. (80% of theory).

EXAMPLE 18

A glass tube fitted with a stopper was charged with 25 g. chlorobenzene and cooled to −20°C. 5.0 g. methylamine were then introduced and the tube was stoppered and placed in a ½ litre autoclave containing 40 g. dimethylammonium N,N-dimethylthiolcarbamate and 40 g. chlorobenzene. The autoclave was sealed and nitrogen was introduced until the pressure reached 40 atmospheres. As a result of the introduction of nitrogen, a pressure difference arose between the inside and outside of the glass tube, causing it to break and allow the reactants to mix. The temperature was then raised to 130°C. and maintained for 2 hours. The contents of the autoclave were then allowed to cool to below 70°C. before being removed from the autoclave. The volatiles were distilled off and the residue was recrystallised from a mixture of benzene and petroleum ether (b.p. 40°–60°C.) to give trimethylurea, which had a melting point of 70°–72°C. The yield was 14.6 g. (88% of theory).

EXAMPLE 19

A solution of 27.5 g. dimethylammonium N,N-dimethylthiolcarbamate in 50 g. o-dichlorobenzene was heated to 150°C. in a flask fitted with a reflux condenser and ammonia was passed through the solution for 2.5 hours. The reaction mixture was then heated at 150°C. for a further 2 hours, before being allowed to cool. The resulting precipitate was filtered and dried to give 1,1-dimethylurea, which had a melting point of 181°–182°C. The yield was 13.0 g. (81% of theory).

EXAMPLE 20

6.0 g. 3-Aminomethylpyridine were reacted with 50 g. dimethylammonium N,N-dimethylthiolcarbamate in 55 g. chlorobenzene for 2 hours under reflux. The volatiles were then distilled off and the residue was recrystallised from benzene to give 1,1-dimethyl-3-(3-pyridylmethyl) urea which had a melting point of 94°–95°C. The yield was 9.0 g. (91% of theory).

EXAMPLE 21

3.0 g. 3-Aminopyridine were reacted with 25 g. dimethylammonium N,N-dimethylthiolcarbamate in 25 g. chlorobenzene for 2 hours under reflux. At the end of this period, the volatiles were distilled off and the residue was recrystallised from benzene to give 1,1-dimethyl-3-3(3-pyridyl) urea (5.0 g.), melting point 120°–122°C. in 95% yield.

What we claim is:

1. A method of purifying secondary ammonium N,N-disubstituted thiolcarbamates of the general formula:

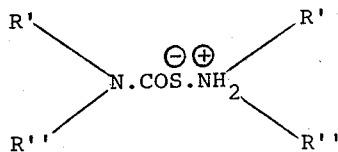

in which R' and R'', which may be the same or different, are alkyl radicals having 1 to 4 carbon atoms or alkenyl radicals having 3 or 4 carbon atoms wherein a solution of a secondary ammonium N,N-disubstituted thiolcarbamate of the above-given general formula in a solvent therefor, which solution also contains impurities, is heated to distil the said thiolcarbamate and solvent from the impurities to give a distillate containing the desired thiolcarbamate in the solvent and free from the said impurities.

2. A method according to claim 1, wherein the solvent and thiolcarbamate are co-distilled under reduced pressure.

3. A method according to claim 1, wherein the thiolcarbamate has been prepared by reacting a secondary amine of the general formula R'.NH.R'', in which R' and R'' have the same meanings as above, in a solvent either with carbon monoxide and sulphur or with carbonyl sulphide.

4. A method according to claim 1 wherein the solvent used is benzene, toluene, a xylene, chlorobenzene or o-dichlorobenzene.

* * * * *